US009698637B2

United States Patent
Ochitani et al.

(10) Patent No.: US 9,698,637 B2
(45) Date of Patent: Jul. 4, 2017

(54) MOTOR AND DISK DRIVE APPARATUS

(71) Applicant: Nidec Corporation, Kyoto (JP)

(72) Inventors: Shunichi Ochitani, Kyoto (JP);
Wataru Yamauchi, Kyoto (JP);
Masayuki Maeda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 280 days.

(21) Appl. No.: 14/692,872

(22) Filed: Apr. 22, 2015

(65) Prior Publication Data
US 2016/0261157 A1  Sep. 8, 2016

(30) Foreign Application Priority Data

Mar. 5, 2015 (JP) .................................. 2015-043320

(51) Int. Cl.
| | |
|---|---|
| *H02K 1/30* | (2006.01) |
| *G11B 25/04* | (2006.01) |
| *H02K 1/27* | (2006.01) |
| *G11B 19/20* | (2006.01) |
| *H02K 15/03* | (2006.01) |

(52) U.S. Cl.
CPC ............... *H02K 1/30* (2013.01); *G11B 19/20* (2013.01); *G11B 19/2045* (2013.01); *G11B 25/043* (2013.01); *H02K 1/2786* (2013.01); *G11B 19/2009* (2013.01); *G11B 19/2018* (2013.01); *H02K 15/03* (2013.01); *H02K 2201/03* (2013.01)

(58) Field of Classification Search
CPC ............ G11B 19/2009; G11B 19/2018; G11B 19/2045; G11B 25/043
USPC .............................................. 360/99.08, 99.12
See application file for complete search history.

(56) References Cited

U.S. PATENT DOCUMENTS

| | | | |
|---|---|---|---|
| 8,922,943 B2 * | 12/2014 | Yamada ................ | F16C 17/107 360/99.08 |
| 9,065,315 B1 * | 6/2015 | Ochitani ................. | H02K 1/30 |
| 2010/0226046 A1 | 9/2010 | Saito et al. | |

FOREIGN PATENT DOCUMENTS

| | | |
|---|---|---|
| JP | 2006-331558 A | 12/2006 |
| JP | 2011-024351 A | 2/2011 |
| JP | 2011-114896 A | 6/2011 |
| JP | 2013-042636 A | 2/2013 |

OTHER PUBLICATIONS

Ochitani et al., "Motor and Disk Drive Apparatus," U.S. Appl. No. 14/570,121, filed Dec. 15, 2014.

* cited by examiner

*Primary Examiner* — Carlos E Garcia
(74) *Attorney, Agent, or Firm* — Keating & Bennett, LLP

(57) ABSTRACT

A rotating portion of a motor includes a magnet, a yoke, and a hub. An upper portion of the yoke is fixed to the hub. The yoke includes a first inner circumferential surface radially opposite to an outer circumferential surface of the magnet with a first gap intervening therebetween, and a second inner circumferential surface radially opposite to the outer circumferential surface of the magnet with a second gap intervening therebetween below the first inner circumferential surface. The second inner circumferential surface is parallel or substantially parallel to the outer circumferential surface of the magnet, and is located radially outward of the first inner circumferential surface. An adhesive is provided in at least a portion of the first gap. No adhesive is provided in at least a lower axial end portion of the second gap.

22 Claims, 7 Drawing Sheets

MOTOR AND DISK DRIVE APPARATUS

BACKGROUND OF THE INVENTION

1. Field of the Invention

The present invention relates to a motor and a disk drive apparatus.

2. Description of the Related Art

Spindle motors arranged to rotate disks are typically installed in hard disk apparatuses and optical disk apparatuses. Such a spindle motor includes a stationary portion fixed to a housing of the apparatus, and a rotating portion arranged to rotate while supporting the disk(s). The spindle motor is arranged to produce a torque by magnetic flux generated between a stator and a magnet, whereby the rotating portion is caused to rotate with respect to the stationary portion. A known spindle motor is described, for example, in JP-A 2006-331558.

A rotating portion of the spindle motor described in JP-A 2006-331558 includes a rotor hub on which a disk is mounted, a rotor yoke, and a magnet. The rotor yoke is fixed to an inner circumferential surface of the rotor hub. In addition, an inner circumferential surface of the rotor yoke and an outer circumferential surface of the magnet are fixed to each other through adhesion or the like (see paragraph [0030] and FIG. 2 of JP-A 2006-331558).

In the case where only an upper axial end portion and its vicinity of the rotor yoke are fixed to the rotor hub in such a motor, the rotor yoke is able to have a high degree of roundness in the vicinity of the upper axial end portion thereof, but a deformation of the rotor yoke may occur, resulting in a reduced degree of roundness of the rotor yoke, in the vicinity of a lower axial end portion of the rotor yoke. The reduced degree of roundness of the rotor yoke may easily lead to a reduced degree of roundness of the magnet, which is fixed to the rotor yoke. If a reduction in the degree of roundness of the magnet occurs, a distance between the magnet and a stator becomes uneven along a circumferential direction, causing magnetic forces to be applied unevenly along the circumferential direction, which may cause vibrations of the spindle motor.

SUMMARY OF THE INVENTION

A motor according to a preferred embodiment of the present invention includes a stationary portion including a stator, and a rotating portion configured to be rotatable about a central axis extending in a vertical direction. The rotating portion includes a magnet, a yoke, and a hub. The magnet is cylindrical or substantially cylindrical, and includes a pole surface located radially opposite to the stator. The yoke is cylindrical or substantially cylindrical, and is located radially outside of the magnet. The hub includes a hub cylindrical portion located radially outside of the yoke, and a hub upper plate portion extending radially inward from an upper axial end of the hub cylindrical portion. The stator includes a stator core which is a magnetic body. An upper portion of the yoke is fixed to the hub. The yoke includes a first inner circumferential surface and a second inner circumferential surface. The first inner circumferential surface is located radially opposite to an outer circumferential surface of the magnet with a first gap intervening therebetween. The second inner circumferential surface is located below the first inner circumferential surface, and includes a portion located radially opposite to the outer circumferential surface of the magnet with a second gap intervening therebetween. The second inner circumferential surface is parallel or substantially parallel to the outer circumferential surface of the magnet, and is located radially outward of the first inner circumferential surface. An adhesive is provided in at least a portion of the first gap. No adhesive is provided in at least a lower axial end portion of the second gap.

According to the above preferred embodiment of the present invention, there is no adhesive located between the magnet and a lower axial end portion and a vicinity of the yoke, which are apt to have a reduced degree of roundness. This contributes to preventing the magnet from becoming deformed along a circumferential direction due to a change in a volume of the adhesive at the time of curing thereof.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, motors and disk drive apparatuses according to preferred embodiments of the present invention will be described. It is assumed herein that a direction parallel or substantially parallel to a central axis of a motor is referred to by the term "axial direction", "axial", or "axially", that directions perpendicular or substantially perpendicular to the central axis of the motor are each referred to by the term "radial direction", "radial", or "radially", and that a direction along a circle centered on the central axis of the motor is referred to by the term "circumferential direction", "circumferential", or "circumferentially". It is also assumed herein that an axial direction is a vertical direction, and that a side on which a top cover is arranged with respect to a base plate is an upper side, and the shape of each member or portion and relative positions of different members or portions will be described based on the above assumptions. It should be noted, however, that the above definitions of the vertical direction and the upper and lower sides are not meant to restrict in any way the orientation of a motor or a disk drive apparatus according to any preferred embodiment of the present invention at the time of manufacture or when in use.

Figure 1:
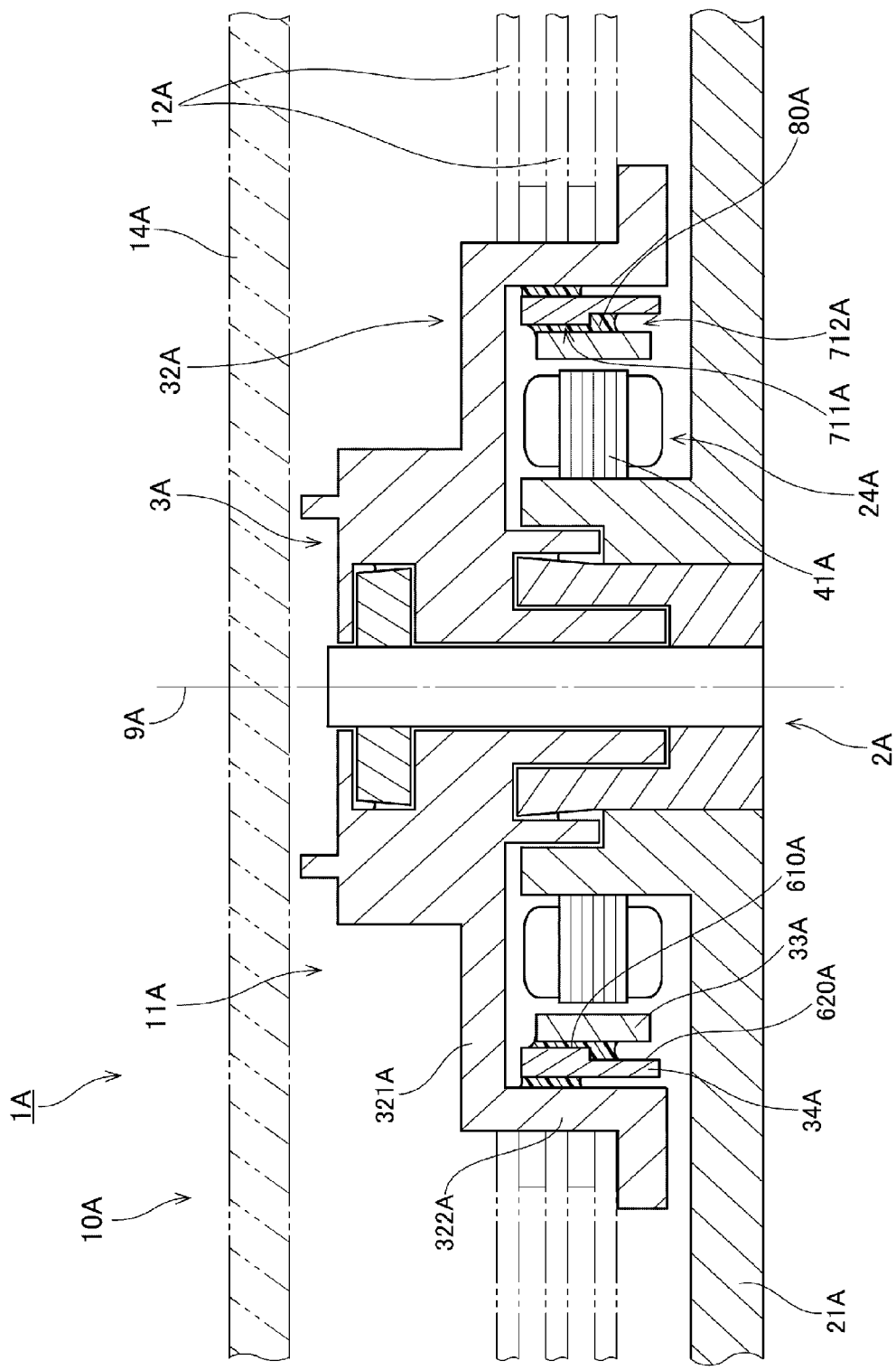
FIG. 1 is a vertical cross-sectional view of a motor according to a first preferred embodiment of the present invention.

FIG. 1 is a vertical cross-sectional view of a motor 11A according to a first preferred embodiment of the present invention. This motor 11A is preferably used in a disk drive apparatus 1A. The disk drive apparatus 1A is configured to rotate disks 12A in a housing 10A. A top cover 14A is configured to cover an upper side of the base plate 21A. Each disk 12A includes a circular hole in a center thereof.

Referring to FIG. 1, the motor 11A includes a stationary portion 2A including a stator 24A, and a rotating portion 3A configured to be rotatable about a central axis 9A extending in a vertical direction. The stator 24A includes a stator core 41A, which is a magnetic body.

The rotating portion 3A preferably includes a hub 32A, a magnet 33A, and a yoke 34A. The hub 32A includes a hub cylindrical portion 322A located radially outside of the yoke 34A, and a hub upper plate portion 321A extending radially inward from an upper axial end of the hub cylindrical portion 322A. The magnet 33A is cylindrical or substantially cylindrical, and includes a pole surface located radially opposite to the stator 24A.

The yoke 34A is cylindrical or substantially cylindrical, and is located radially outside of the magnet 33A. In addition, an upper portion of the yoke 34A is fixed to the hub 32A.

The yoke 34A preferably includes a first inner circumferential surface 610A and a second inner circumferential surface 620A. The first inner circumferential surface 610A is preferably located radially opposite to an outer circumferential surface of the magnet 33A with a first gap 711A intervening therebetween.

The second inner circumferential surface 620A is located below the first inner circumferential surface 610A, and at least a portion of the second inner circumferential surface 620A is located radially opposite to the outer circumferential surface of the magnet 33A with a second gap 712A intervening therebetween. The second inner circumferential surface 620A is parallel or substantially parallel to the outer circumferential surface of the magnet 33A. In addition, the second inner circumferential surface 620A is located radially outward of the first inner circumferential surface 610A.

An adhesive 80A is provided in at least a portion of the first gap 711A. In addition, no adhesive 80A is preferably provided in at least a lower axial end portion of the second gap 12A.

The upper portion of the yoke 34A is fixed to the hub 32A. The upper portion and a vicinity of the yoke 34A are fixed to the hub 32A over an entire circumferential extent thereof, and therefore, a deformation rarely occurs over the entire circumferential extent, allowing a high degree of roundness of the upper portion and a vicinity of the yoke 34A. Meanwhile, a portion of the yoke 34A which is not fixed to the hub 32A has low rigidity, and a deformation is apt to more easily occur over its circumferential extent with decreasing height from a top toward a bottom of that portion of the yoke 34A, allowing a reduction in the degree of roundness to easily occur. If a lower axial end portion and a vicinity of the yoke 34A, which have a low degree of roundness, were fixed to the magnet 33A through adhesion, the magnet 33A might become deformed unevenly along a circumferential direction due to a change in a volume of the adhesive 80A at the time of curing thereof.

In particular, the second inner circumferential surface 620A is located radially outward of the first inner circumferential surface 610A. Accordingly, a portion of the adhesive 80A which is provided in the second gap 712A has a greater volume per unit axial length than a portion of the adhesive 80A which is provided in the first gap 711A. Therefore, the change in the volume of the adhesive 80A at the time of the curing thereof is greater in the second gap 712A than in the first gap 711A.

In the motor 11A, no adhesive is provided in at least the lower axial end portion of the second gap 712A. In other words, there is preferably no adhesive 80A located between the magnet 33A and the lower axial end portion and a vicinity of the yoke 34A, which are apt to have a reduced degree of roundness. This contributes to reducing the likelihood that the magnet 33A will be deformed.

Figure 2:
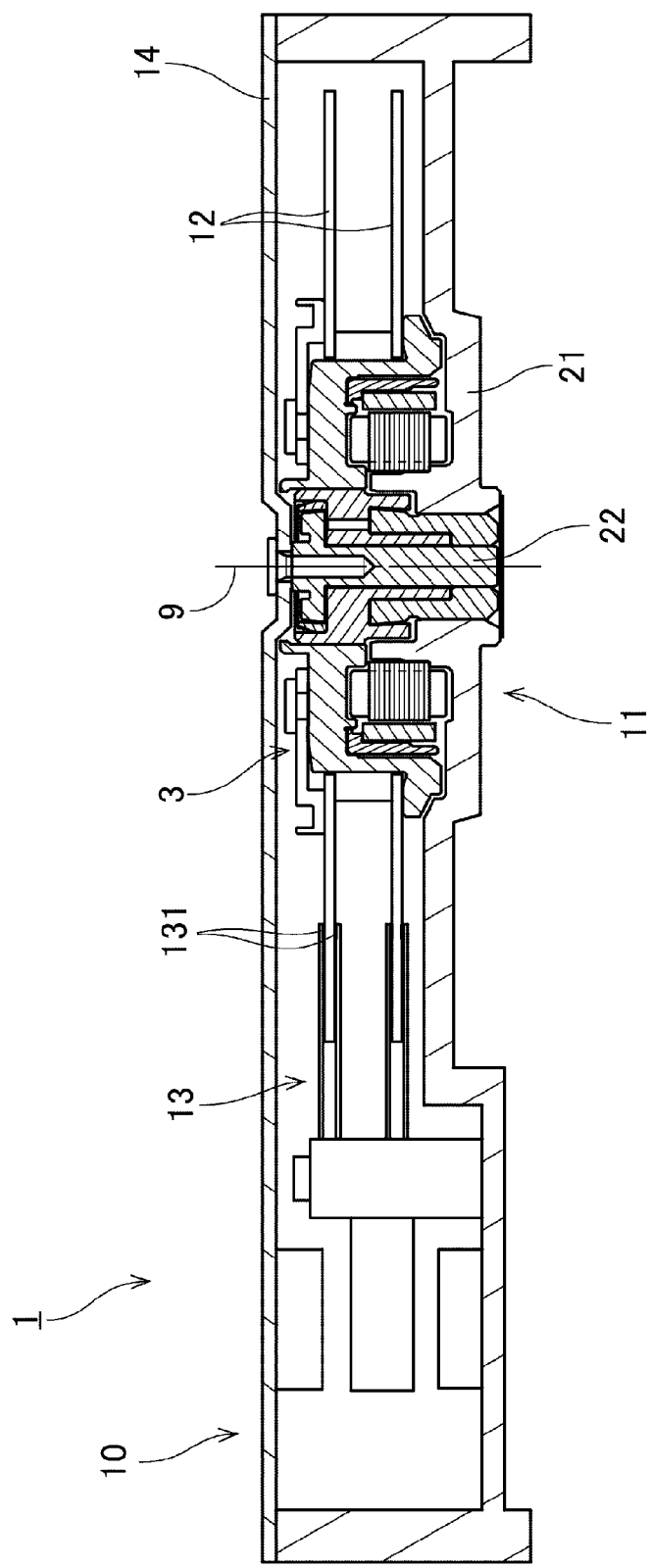
FIG. 2 is a vertical cross-sectional view of a disk drive apparatus according to a second preferred embodiment of the present invention.

FIG. 2 is a vertical cross-sectional view of a disk drive apparatus 1 including a motor 11 according to a second preferred embodiment of the present invention. The disk drive apparatus 1 is configured to rotate two magnetic disks 12, each of which includes a circular hole in a center thereof, to perform reading and writing of information from or to the magnetic disks 12. Referring to FIG. 2, the disk drive apparatus 1 preferably includes the motor 11, the two magnetic disks 12, an access portion 13, and a top cover 14.

The motor 11 is configured to rotate the two magnetic disks 12 about a central axis 9 while supporting the magnetic disks 12. The motor 11 includes a base plate 21 extending perpendicularly to the central axis 9. An upper side of the base plate 21 is covered with the top cover 14. A rotating portion 3 of the motor 11, the two magnetic disks 12, and the access portion 13 are accommodated inside a housing 10 defined by the base plate 21 and the top cover 14. The access portion 13 is configured to move heads 131 along recording surfaces of the magnetic disks 12 to perform the reading and the writing of information from or to the magnetic disks 12.

Note that the number of magnetic disks 12 included in the disk drive apparatus 1 may alternatively be one or more than two. Also note that the access portion 13 may be configured to perform at least one of the reading and the writing of information from or to the magnetic disks 12, which are supported by a hub 32 described below.

The housing 10 is configured to accommodate at least a portion of the motor 11 and the access portion 13. An interior space of the housing 10 is preferably a clean space with no, or only an extremely small amount of, dirt or dust. In this disk drive apparatus 1, the interior space of the housing 10 is preferably filled with clean air. Note, however, that the interior space of the housing 10 may alternatively be filled with a helium gas, a hydrogen gas, a nitrogen gas, etc. instead of air. Also note that the interior space of the housing 10 may alternatively be filled with a mixture of any of these gases and air.

Figure 3:
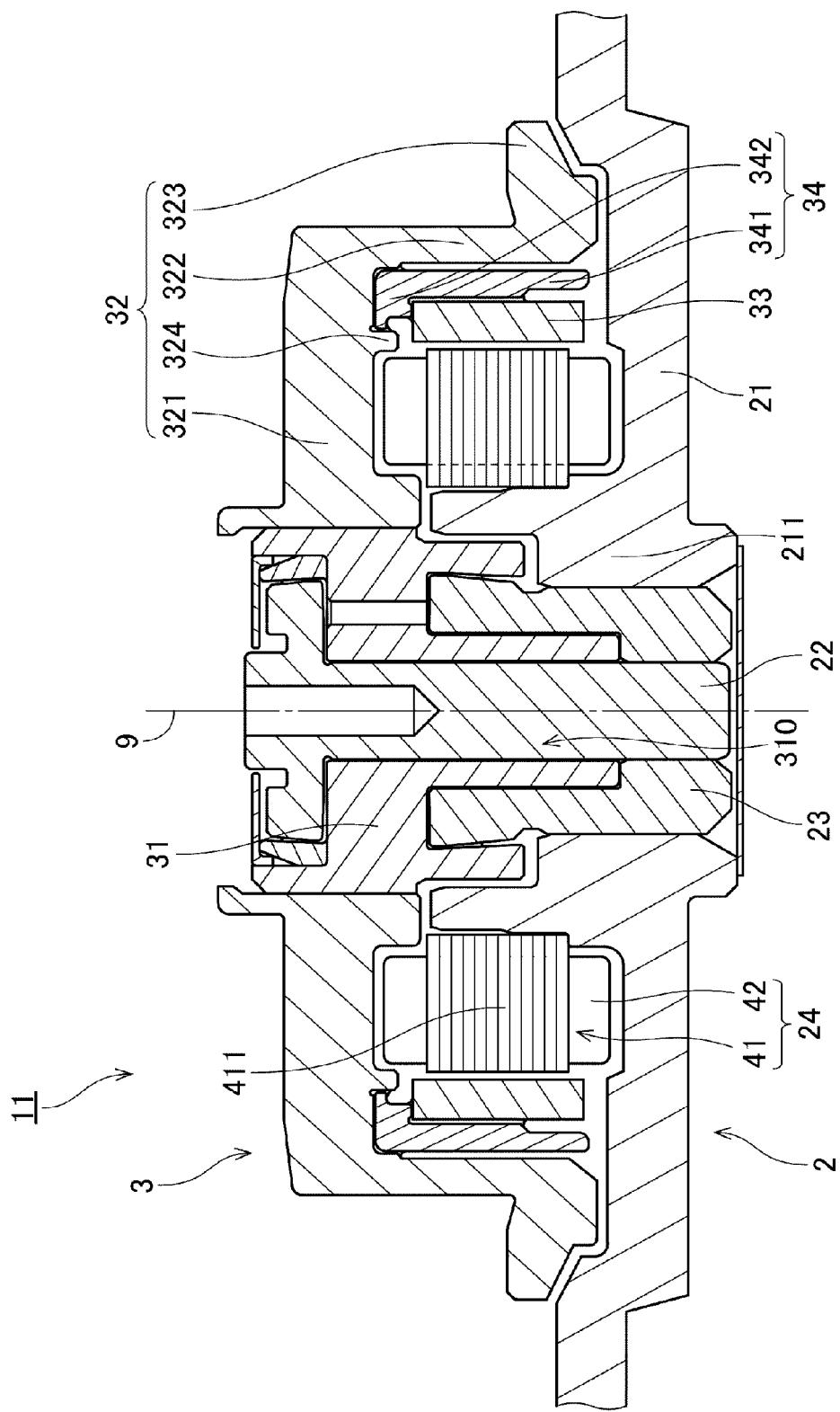
FIG. 3 is a vertical cross-sectional view of a motor according to the second preferred embodiment of the present invention.

Next, the structure of the motor 11 used in the disk drive apparatus 1 will now be described in more detail below. FIG. 3 is a vertical cross-sectional view of the motor 11. Referring to FIG. 3, the motor 11 includes a stationary portion 2 and the rotating portion 3. The stationary portion 2 is stationary relative to the housing 10 of the disk drive apparatus 1. The rotating portion 3 is supported to be rotatable with respect to the stationary portion 2.

The stationary portion 2 preferably includes the base plate 21, a shaft 22, a lower annular member 23, and a stator 24.

The base plate 21 extends perpendicularly or substantially perpendicularly to the central axis 9 below the stator 24, the rotating portion 3, the magnetic disks 12, and the access portion 13.

The shaft 22 extends along the central axis 9. As illustrated in FIG. 2, an upper axial end portion of the shaft 22 is fixed to the top cover 14 of the disk drive apparatus 1.

Meanwhile, referring to FIG. 3, a lower axial end portion of the shaft 22 is fixed to a cylindrical holder portion 211 of the base plate 21 through the lower annular member 23.

The stator 24 is preferably an armature including a stator core 41 and a plurality of coils 42. The stator core 41 is a magnetic body. The stator core 41 is fixed to the base plate 21. In addition, the stator core 41 includes a plurality of teeth 411 projecting radially outward. The coils 42 are a collection of conducting wires wound around the teeth 411.

The rotating portion 3 preferably includes a sleeve 31, the hub 32, a magnet 33, and a yoke 34.

The sleeve 31 extends in the axial direction to assume a tubular shape around the shaft 22. The sleeve 31 includes a central through hole 310 passing therethrough in the vertical direction. At least a portion of the shaft 22 is accommodated in the central through hole 310.

A lubricating fluid is located between the sleeve 31 and a combination of the shaft 22 and the lower annular member 23. The sleeve 31 is supported through the lubricating fluid to be rotatable with respect to the combination of the shaft 22 and the lower annular member 23. Note that the rotating portion 3 may alternatively be supported to be rotatable with respect to the stationary portion 2 through a bearing having another structure, such as, for example, a ball bearing or a plain bearing, instead of a fluid bearing as described above.

The hub 32 is located radially outside of the sleeve 31. A metal that is not a ferromagnetic material, such as, for example, an aluminum alloy, is preferably used as a material of the hub 32. Although the sleeve 31 and the hub 32 are preferably defined by separate members according to the preferred embodiment illustrated in FIG. 3, the sleeve 31 and the hub 32 may alternatively be defined integrally with each other as a single monolithic member.

The hub 32 preferably includes a hub upper plate portion 321, a hub cylindrical portion 322, a disk mount portion 323, and a projecting portion 324.

The hub upper plate portion 321 preferably has an annular shape above the stator 24. In addition, the hub upper plate portion 321 extends radially inward from an upper axial end of the hub cylindrical portion 322. The hub cylindrical portion 322 extends downward from a radially outer end portion of the hub upper plate portion 321 to assume a tubular shape. The hub cylindrical portion 322 is located radially outside of the yoke 34.

The disk mount portion 323 is annular, and extends radially outward from an outer circumference of the hub cylindrical portion 322. According to the preferred embodiment illustrated in FIG. 3, the disk mount portion 323 projects from a lower axial end portion of the hub cylindrical portion 322. A lower surface of the lower magnetic disk 12 is in contact with at least a portion of an upper surface of the annular disk mount portion 323. In other words, the upper surface of the disk mount portion 323 is a disk mount surface. The projecting portion 324 projects downward from a lower surface of the hub upper plate portion 321 to assume an annular or substantially annular shape.

The magnet 33 is cylindrical or substantially cylindrical in shape, and is located radially outside of the stator 24. An inner circumferential surface of the magnet 33 includes north and south poles arranged to alternate with each other in the circumferential direction. In addition, the inner circumferential surface of the magnet 33 is located radially opposite to a radially outer end surface of each of the teeth 411 with a slight gap intervening therebetween. That is, the magnet 33 includes a pole surface located radially opposite to the stator 24.

The yoke 34 is a cylindrical or substantially cylindrical member located between the hub 32 and the magnet 33. The yoke 34 is made of a ferromagnetic material, such as, for example, a metal. The yoke 34 is configured to cover at least a portion of an outer circumferential surface of the magnet 33. This contributes to preventing a magnetic force from leaking through the outer circumferential surface of the magnet 33. In other words, the likelihood of a reduction in a torque of the motor 11 is reduced.

The yoke 34 is preferably defined by, for example, press working. The yoke 34 preferably has a smaller thickness at a lower portion thereof than at an upper portion thereof. Therefore, when the yoke 34 is defined by press working, for example, a lower axial end portion and a vicinity of the yoke 34 are particularly apt to have a lower degree of roundness than that of an upper axial end portion and a vicinity of the yoke 34. Note that the yoke 34 may alternatively be defined by another method, such as, for example, a cutting process.

Once electric drive currents are supplied to the coils 42 in the motor 11 described above, magnetic flux is generated around each of the teeth 411. Then, interaction between the magnetic flux of the teeth 411 and magnetic flux of the magnet 33 produces a circumferential torque between the stationary portion 2 and the rotating portion 3, so that the rotating portion 3 is caused to rotate about the central axis 9 with respect to the stationary portion 2. The magnetic disks 12 supported by the hub 32 are thus caused to rotate about the central axis 9 together with the rotating portion 3.

Figure 4:
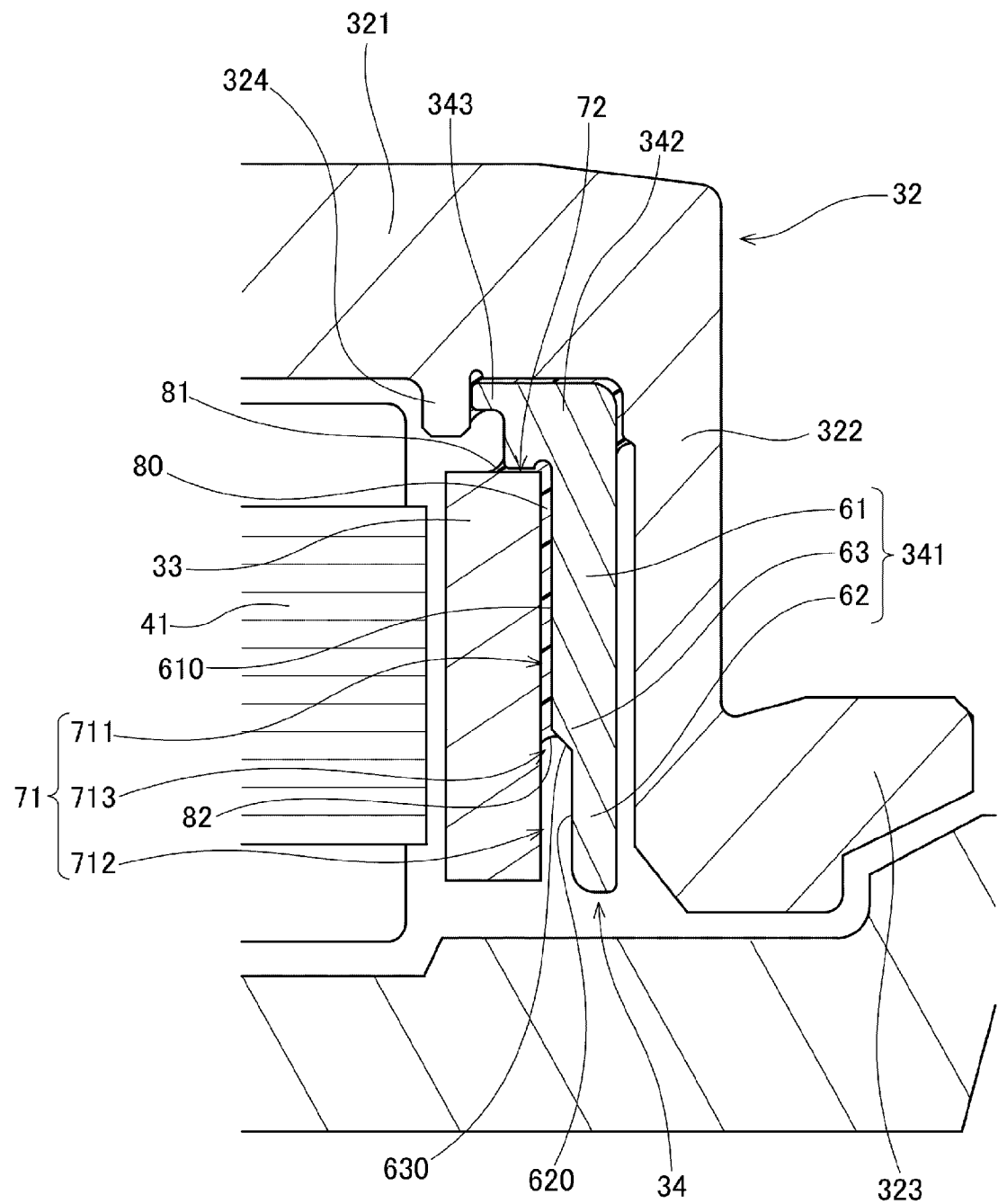
FIG. 4 is a partial vertical cross-sectional view of the motor according to the second preferred embodiment of the present invention.

Next, the structure of each of the magnet 33, the yoke 34, and the hub 32, and a condition in which each of the magnet 33, the yoke 34, and the hub 32 is fixed will now be described below. FIG. 4 is a partial vertical cross-sectional view of the motor 11. Referring to FIG. 4, the hub 32 and the yoke 34 are preferably fixed to each other through, for example, an adhesive 80, and the magnet 33 and the yoke 34 are also preferably fixed to each other through, for example, the adhesive 80. Note that, in this motor 11, the yoke 34 is preferably press fitted to the hub 32, and the hub 32 and the yoke 34 are fixed to each other through the adhesive 80. Note that the magnet 33 and the yoke 34 may be fixed to each other through only the adhesive 80.

The yoke 34 of the motor 11 preferably includes a yoke cylindrical portion 341 and a yoke upper plate portion 342. The yoke cylindrical portion 341 is a cylindrical or substantially cylindrical portion located radially outside of the magnet 33 and extending along the central axis 9. The yoke upper plate portion 342 is an annular portion extending radially inward from an upper axial end of the yoke cylindrical portion 341.

The upper portion of the yoke 34 is preferably fixed to the hub 32 through both press fitting and adhesion. Specifically, the yoke upper plate portion 342 includes an upper plate fixing portion 343 projecting radially inward from an upper axial end of an inner circumferential surface of the yoke upper plate portion 342. An inner circumferential surface of the upper plate fixing portion 343 and an outer circumferential surface of the projecting portion 324 of the hub 32 are fixed to each other through press fitting. In addition, the inner circumferential surface of the upper plate fixing portion 343 and the outer circumferential surface of the projecting portion 324 are fixed to each other through the adhesive 80, an upper surface of the yoke upper plate portion 342 and the lower surface of the hub upper plate portion 321 are fixed to each other through the adhesive 80, and an upper portion of an outer circumferential surface of the yoke 34 and an inner circumferential surface of the hub cylindrical portion 322 are fixed to each other through the adhesive 80.

The upper portion and a vicinity of the yoke 34 are preferably fixed to the hub 32 over an entire circumferential extent thereof, and therefore, a deformation rarely occurs over the entire circumferential extent, allowing a high degree of roundness of the upper portion and a vicinity of the yoke 34. In addition, a portion of the yoke 34 which is not fixed to the hub 32 has low rigidity, and a deformation is apt to more easily occur over its circumferential extent with decreasing height from a top toward a bottom of that portion of the yoke 34, allowing a reduction in the degree of roundness to easily occur.

In this motor 11, the hub 32 and the yoke 34 are preferably more securely fixed to each other through both press fitting and adhesion than in the case where the hub 32 and the yoke 34 are fixed to each other through only adhesion. Accordingly, rigidity of the hub 32 and the yoke 34 as a whole is improved to reduce vibrations of the motor 11. In addition, since the upper portion of the yoke 34 is fixed to the hub 32 through both press fitting and adhesion, the upper portion and a vicinity of the yoke are further improved in the degree of roundness. This contributes to reducing the likelihood of a deformation of the magnet 33, which is fixed to the yoke 34 through adhesion.

Note that the yoke upper plate portion 342 may not necessarily include the upper plate fixing portion 343. In this case, the inner circumferential surface of the yoke upper plate portion 343 and the projecting portion 324 may be fixed to each other through the adhesive 80. Also note that the yoke upper plate portion 342 and the outer circumferential surface of the projecting portion 324 may be fixed to each other through the adhesive 80 and insertion.

In addition, since the upper portion of the yoke 34 is preferably fixed to each of the lower surface of the hub upper plate portion 321, the inner circumferential surface of the hub cylindrical portion 322, and the outer circumferential surface of the projecting portion 324 (that is, three surfaces), the degree of roundness of the upper portion of the yoke 34 is improved. Thus, the degree of roundness of the yoke 34 as a whole is improved. This contributes to reducing the likelihood of a deformation of the magnet 33, which is fixed to the yoke 34 through adhesion.

An inner circumferential surface of the yoke 34 preferably includes a first inner circumferential surface 610, a second inner circumferential surface 620, and a joining inner circumferential surface 630. The second inner circumferential surface 620 is located below the first inner circumferential surface 610, and is located radially outward of the first inner circumferential surface 610. Each of the first inner circumferential surface 610 and the second inner circumferential surface 620 is parallel or substantially parallel to the outer circumferential surface of the magnet 33. The joining inner circumferential surface 630 joins a lower axial end of the first inner circumferential surface and an upper axial end of the second inner circumferential surface 620. In addition, the joining inner circumferential surface 630 becomes gradually more distant from the central axis 9 from an upper axial end toward a lower axial end thereof.

Here, a radial gap between the outer circumferential surface of the magnet 33 and an inner circumferential surface of the yoke cylindrical portion 341 is referred to as a radial gap 71. In addition, an axial gap between an upper surface of the magnet 33 and the yoke upper plate portion 342 is referred to as an axial gap 72. An upper axial end of the radial gap 71 and a radially outer end of the axial gap 72 are joined to each other.

The radial gap 71 includes a first gap 711, a second gap 712, and a tapered gap 713.

The first gap 711 is located at an upper axial end of the radial gap 71. The first inner circumferential surface 610 and the outer circumferential surface of the magnet 33 are located radially opposite to each other with the first gap 711 intervening therebetween. The adhesive 80 is provided in at least a portion of the first gap 711.

The second gap 712 is located at a lower axial end of the radial gap 71. The second inner circumferential surface 620 and the outer circumferential surface of the magnet 33 are located radially opposite to each other with the second gap 712 intervening therebetween. No adhesive 80 is provided in at least a lower axial end portion of the second gap 712. In addition, the second gap 712 has a radial width greater than a radial width of the first gap 711.

The tapered gap 713 is located below the first gap 711 and above the second gap 712. The tapered gap 713 is a radial gap between the joining inner circumferential surface 630 and the outer circumferential surface of the magnet 33. An upper axial end portion of the tapered gap 713 corresponds to a lower axial end portion of the first gap 711. Meanwhile, a lower axial end portion of the tapered gap 713 corresponds to an upper axial end portion of the second gap 712. The tapered gap 713 gradually increases in radial width with decreasing height from an upper axial end thereof.

The yoke cylindrical portion 341 preferably includes a first cylindrical portion 61, a second cylindrical portion 62, and a tapered portion 63.

The first cylindrical portion 61 is located at an upper portion of the yoke cylindrical portion 341. At least a portion of the first cylindrical portion 61 is fixed to the magnet 33 through the adhesive 80.

The second cylindrical portion 62 is located below the first cylindrical portion 61 and at a lower portion of the yoke cylindrical portion 341. In other words, the second cylindrical portion 62 is located at a lower axial end of the yoke 34. In addition, the second cylindrical portion 62 has a radial width smaller than a radial width of the first cylindrical portion 61.

The tapered portion 63 is located below the first cylindrical portion 61 and above the second cylindrical portion 62. The tapered portion 63 joins a lower axial end of the first cylindrical portion 61 and an upper axial end of the second cylindrical portion 62. The tapered portion 63 gradually decreases in radial width with decreasing height from an upper axial end thereof.

In this motor 11, the outer circumferential surface of the yoke 34 is a cylindrical curved surface every point of which is equidistant or substantially equidistant from the central axis 9. That is, an outer circumferential surface of the yoke upper plate portion 342, an outer circumferential surface of the first cylindrical portion 61, an outer circumferential surface of the second cylindrical portion 62, and an outer circumferential surface of the tapered portion 63 are equidistant or substantially equidistant from the central axis 9.

As described above, the yoke 34 decreases in radial width in a stepwise manner from an upper axial end to a lower axial end thereof. Accordingly, the likelihood of a deformation of the yoke 34 increases from the upper axial end toward the lower axial end of the yoke 34. In addition, the upper portion of the yoke 34 is fixed to the hub 32. Therefore, the upper portion of the yoke 34, which is fixed to the hub 32, and a vicinity thereof, have a high degree of roundness. Because of the above-described structure, the degree of roundness of the yoke 34 decreases from the upper axial end toward the lower axial end of the yoke 34.

The adhesive 80 is provided in each of the radial gap 71 and the axial gap 72. More specifically, as illustrated in FIG.

4, each of the first gap 711 of the radial gap 71 and the axial gap 72 is filled with the adhesive 80.

An upper surface 81 of the adhesive 80 located between the magnet 33 and the yoke 34 is located in the vicinity of a radially inner end of the axial gap 72. Thus, the magnet 33 and the yoke 34 are both radially and axially fixed to each other as a result of the adhesive 80 being provided not only in the radial gap 71 but also in the axial gap 72. Accordingly, an increase in the strength with which the magnet 33 and the yoke 34 are fixed to each other is achieved.

Meanwhile, a lower surface 82 of the adhesive 80 located between the magnet 33 and the yoke 34 is located in the tapered gap 713. Thus, the adhesive 80 provided in the radial gap 71 before being cured is attracted toward the first gap 711 by a capillary force during a process of fitting the yoke 34 and the magnet 33 to each other during manufacture of the motor 11 to stabilize a position of the lower surface 82 of the adhesive 80.

Since the lower surface 82 of the adhesive 80 is located in the tapered gap 713, the adhesive 80 is located at at least a lower axial end of the first gap 711. In addition, the lower surface 82 of the adhesive 80 is located at an axial level lower than an axial level of the disk mount surface. Thus, a wide area of the first gap 711 is filled with the adhesive 80, so that the strength with which the magnet 33 and the yoke 34 are fixed to each other is further increased.

In addition, because the lower surface 82 of the adhesive 80 is located in the tapered gap 713, no adhesive 80 is provided in the second gap 712.

Figure 5:
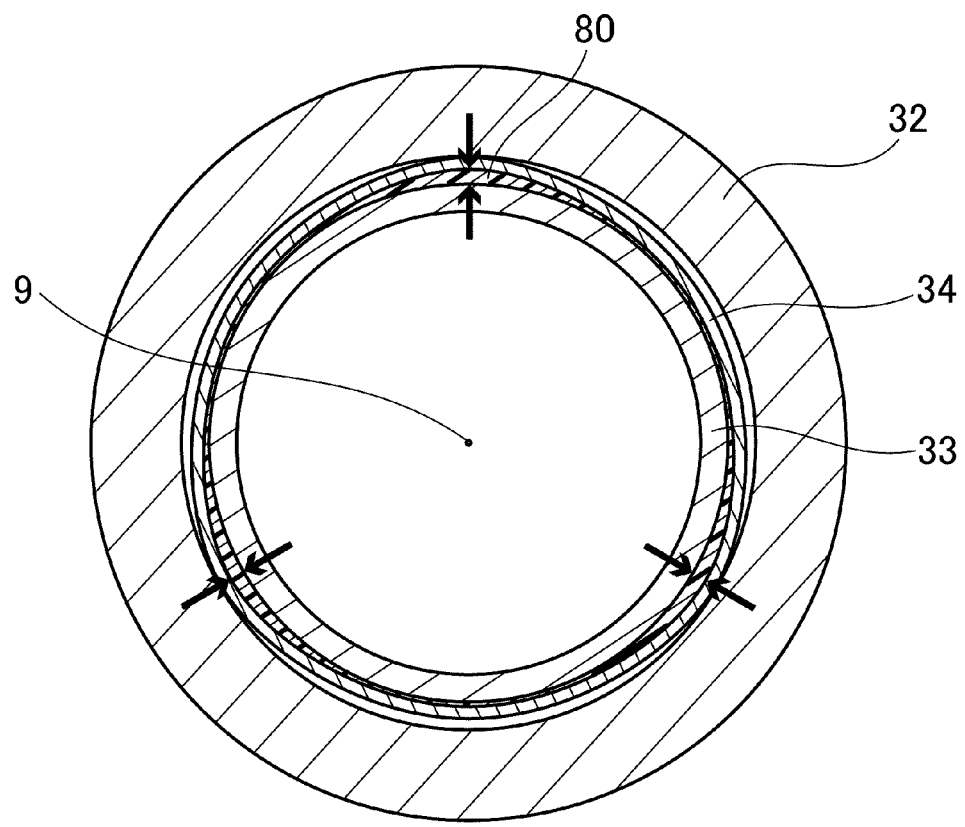
FIG. 5 is a horizontal cross-sectional view of a hub, a magnet, and a yoke before an adhesive is cured according to a comparative example with respect to the present invention.
Figure 6:
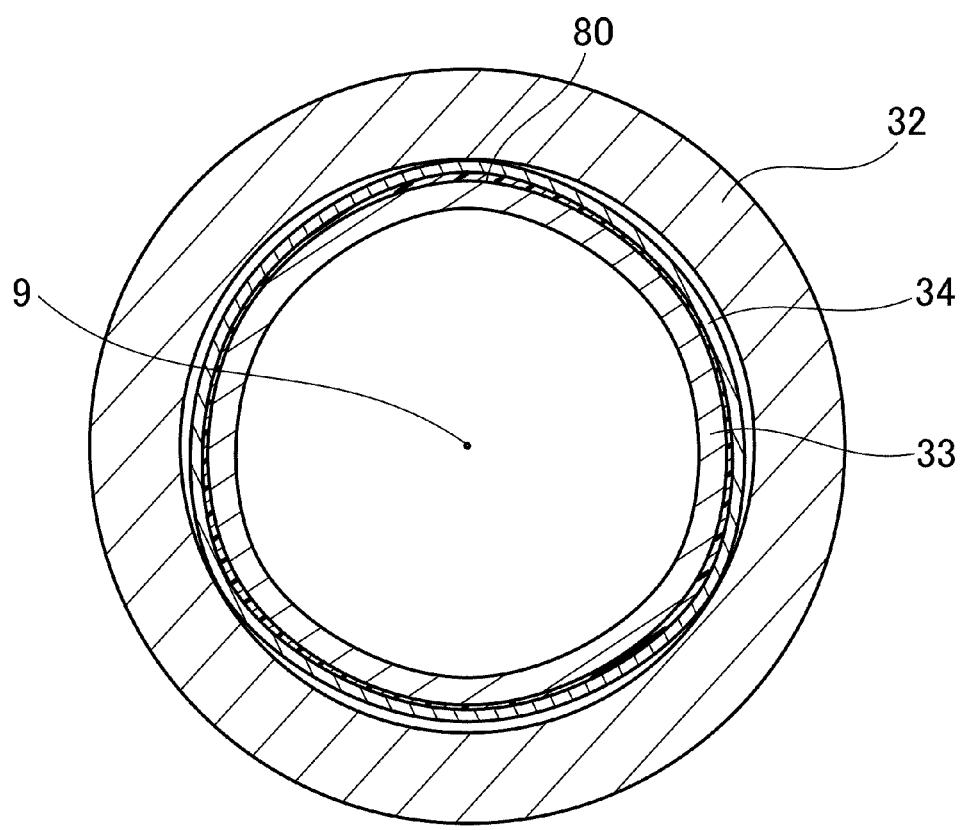
FIG. 6 is a horizontal cross-sectional view of the hub, the magnet, and the yoke after the adhesive is cured according to the comparative example with respect to the present invention.

FIGS. 5 and 6 are each a horizontal cross-sectional view of the hub 32, the magnet 33, and the yoke 34, illustrating portions thereof in the vicinity of the lower axial end portion of the second gap 712, in the case where the second gap 712 is filled with the adhesive 80 up to the lower axial end portion of the second gap 712. FIG. 5 illustrates a state before the adhesive 80 is cured, whereas FIG. 6 illustrates a state after the adhesive 80 is cured.

As described above, the upper portion of the yoke 34 is fixed to the hub 32. The upper portion and a vicinity of the yoke 34 are fixed to the hub 32 over the entire circumferential extent thereof, and therefore, a deformation rarely occurs over the entire circumferential extent, allowing a high degree of roundness of the upper portion and a vicinity of the yoke 34. In addition, the portion of the yoke 34 which is not fixed to the hub 32 has low rigidity, and a deformation is apt to more easily occur over its circumferential extent with decreasing height from the top toward the bottom of that portion of the yoke 34, allowing a reduction in the degree of roundness to easily occur. Thus, the yoke cylindrical portion 341 decreases in the degree of roundness with decreasing height toward a lower axial end of the yoke cylindrical portion 341.

Thus, referring to FIG. 5, every point of the lower axial end portion of the yoke 34 along the circumferential direction is not equidistant from the central axis 9. In more detail, the radial width of the second gap 712 is uneven along the circumferential direction. The lower axial end portion of the yoke 34 may, for example, become deformed to assume or substantially assume the shape of a triangle, with three points along the circumferential direction projecting radially outward, or become deformed to assume or substantially assume the shape of a rhombus, with four points along the circumferential direction projecting radially outward. In FIG. 5, the lower axial end portion of the yoke 34 is deformed such that the shape of the lower axial end portion of the yoke 34 approaches the shape of a rounded triangle.

In the case where the magnet 33 and the yoke 34 are fixed to each other through adhesion, with the lower axial end portion of the yoke 34 being deformed, in the process of fitting the magnet 33 and the yoke 34 to each other, the amount of the adhesive 80 located between the magnet 33 and the yoke 34 is uneven along the circumferential direction as illustrated in FIG. 5 if the second gap 712 is filled with the adhesive 80 up to the lower axial end portion of the second gap 712.

Near a portion of the lower axial end portion of the yoke 34 which projects radially outward, where a reduction in the degree of roundness of the yoke 34 has occurred, the amount of the adhesive 80 located between the magnet 33 and the yoke 34 is increased. Meanwhile, the volume of the adhesive 80 reduces when the adhesive 80 is cured, and a greater amount of the adhesive 80 provided involves a greater change in the volume of the adhesive 80. Thus, as indicated by arrows in FIG. 5, at or near each portion of the lower axial end portion of the yoke 34 which projects radially outward, the magnet 33 and the yoke 34 are pulled radially outward and radially inward, respectively, when the adhesive 80 is cured. As a result, the magnet 33 becomes deformed to match the shape of the yoke 34 as illustrated in FIG. 6, with the result that a distance between a lower axial end portion of the magnet 33 and the central axis 9 is uneven along the circumferential direction. As described above, when the second gap 712 is filled with the adhesive 80 up to the lower axial end portion of the second gap 712, the magnet 33 may become deformed unevenly along the circumferential direction.

In the motor 11, no adhesive 80 is provided in at least the lower axial end portion of the second gap 712. In other words, no adhesive 80 is located between the magnet 33 and the lower axial end portion and a vicinity of the yoke 34, where the yoke 34 has the lowest degree of roundness. Accordingly, since no adhesive 80 is provided in a region where the radial gap 71 is apt to be uneven in radial width in the vicinity of the lower axial end portion of the yoke 34, the likelihood that the magnet 33 will be pulled radially outward when the adhesive 80 is cured is reduced. Thus, the likelihood that the magnet 33 will be deformed is reduced, which in turn reduces the likelihood that vibrations of the motor 11 will occur due to an uneven width of a radial gap between an outer circumferential surface of the stator 34 and the inner circumferential surface of the magnet 33.

In addition, in this motor 11, no adhesive 80 is located at least in an area from a lower axial end to an axial middle portion of the second gap 712. As described above, the yoke cylindrical portion 341 decreases in the degree of roundness with decreasing height toward the lower axial end of the yoke cylindrical portion 341. Therefore, the second cylindrical portion 62, which is located at the lower axial end of the yoke cylindrical portion 341, has the lowest degree of roundness in the yoke cylindrical portion 341. Further, the second cylindrical portion 62 has a particularly low degree of roundness from a lower axial end to an axial middle portion of the second cylindrical portion 62. In this motor 11, no adhesive 80 is located between the magnet 33 and a lower half of the second cylindrical portion 62, which has a particularly low degree of roundness in the yoke 34. This contributes to further reducing the likelihood that the magnet 33 will be deformed.

Furthermore, in this motor 11, no adhesive 80 is provided in the second gap 712. In other words, no adhesive 80 is located between the magnet 33 and the entire second cylindrical portion 62, which has the lowest degree of roundness in the yoke cylindrical portion 341. This contributes to further reducing the likelihood that the magnet 33 will be deformed.

The above-described structure of the motor 11 allows the hub 32 and the yoke 34 to be securely fixed to each other, allows the magnet 33 and the yoke 34 to be securely fixed to each other, and reduces the likelihood that the magnet 33 will be deformed. Accordingly, an improvement in rigidity of the rotating portion 3 is achieved to reduce the vibrations of the motor 11, and the reduction in the likelihood that the magnet 33 will be deformed contributes to further reducing the vibrations of the motor 11.

In particular, in this motor 11, the radial width of the second gap 712 is greater than a radial distance between the magnet 33 and the stator core 41. Accordingly, even when the adhesive 80 is adhered to the second inner circumferential surface 620, the likelihood that the second inner circumferential surface 620 and the outer circumferential surface of the magnet 33 are joined to each other through the adhesive 80 at or near the lower axial end portion of the yoke 34 is reduced. Thus, the likelihood that the magnet 33 will be pulled radially outward when the adhesive 80 is cured, that is, the likelihood that the magnet 33 will be deformed, is reduced.

In addition, a volume of the second gap 712 is greater than a volume of the first gap 711. Further, the volume of the second gap 712 is greater than a volume of the adhesive 80 located between the magnet 33 and the yoke 34. When the magnet 33 is inserted in the yoke 34, the outer circumferential surface of the magnet 33 moves upward while scraping the adhesive 80 applied to the second inner circumferential surface 620 off the second inner circumferential surface 620. A large volume of the second gap 712 enables a greater amount of the adhesive 80 to be applied to the second inner circumferential surface 620. Thus, it is possible to apply a sufficient amount of the adhesive 80 to the second inner circumferential surface 620 to fill the first gap 711 with the adhesive 80 when the magnet 33 is inserted in the yoke 34. Accordingly, the strength with which the magnet 33 and the yoke 34 are adhered to each other is improved.

The upper axial end portion of the second gap 712 is located at an axial level lower than an axial level of an axial middle portion of the stator core 41, and radially overlaps with the stator core 41. In this motor 11, the second gap 712, where no adhesive 80 is provided, is lengthened in the axial direction to a position which radially overlaps with the stator core 41. In particular, because a region at which the stator core 41 and the magnet 33 are radially opposed to each other is a region at which a magnetic force occurs, it is necessary to maintain a uniform radial distance between an outer circumferential surface of the stator core 41 and the inner circumferential surface of the magnet 33 along the circumferential direction. Since the second gap 712 radially overlaps with the stator core 41, the likelihood that a portion of the magnet 33 which is opposed to the stator core 41 will be deformed is reduced. As a result, a further reduction in the vibrations of the motor 11 is achieved.

In addition, the stator core 41 of the motor 11 is preferably defined by laminated steel sheets, more specifically, twelve or more electromagnetic steel sheets placed one upon another, for example. Thus, as illustrated in FIG. 3, an axial dimension of the stator core 41 is greater than a radial dimension of the stator core 41. In addition, an axial dimension of each of the magnet 33 and the yoke 34 is greater than the axial dimension of the stator core 41.

When the stator core 41 has a large axial dimension as described above, a large torque is obtained without a need to increase a diameter of the motor 11. However, the use of the stator core 41 having the large axial dimension involves an increase in the axial dimension of the yoke 34, and may thus lead to a reduction in the degree of roundness of the yoke 34, in particular, in the vicinity of the lower axial end portion of the yoke 34. However, in this motor 11, no adhesive 80 is located between the magnet 33 and the lower axial end portion and a vicinity of the yoke 34. This contributes to reducing the likelihood that the magnet 33 will be deformed together with the yoke 34.

Note that the stator core may have an axial dimension greater than twice the radial width of the stator core. This will make it possible to obtain a still larger torque without a need to increase the diameter of the motor. In this case, the axial dimension of the yoke will be further increased, making it more likely that the degree of roundness of the yoke will be further reduced in the vicinity of the lower axial end portion of the yoke. However, when no adhesive is located between the magnet and the lower axial end portion and a vicinity of the yoke as described above, the likelihood that the magnet 33 will be deformed together with the yoke 34 is reduced.

Figure 7:
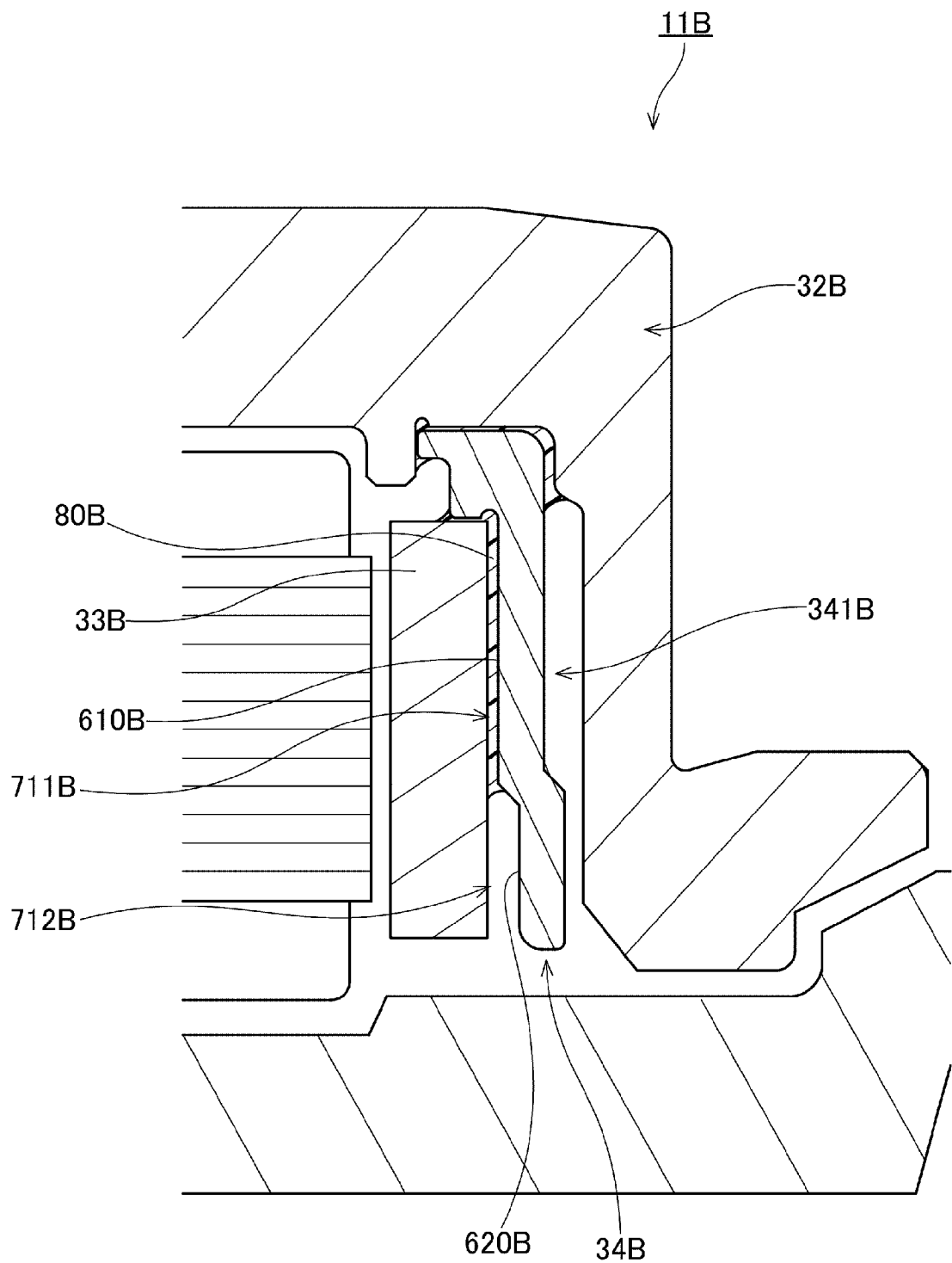
FIG. 7 is a partial vertical cross-sectional view of a motor according to an example modification of the second preferred embodiment of the present invention.

FIG. 7 is a partial vertical cross-sectional view of a motor 11B according to an example modification of the above-described second preferred embodiment of the present invention. The motor 11B includes a hub 32B, a cylindrical or substantially cylindrical yoke 34B, and a cylindrical or substantially cylindrical magnet 33B. In this motor 11B, a yoke cylindrical portion 341B preferably has a uniform or substantially uniform thickness.

An upper portion of the yoke 34B is fixed to the hub 32B. The upper portion and a vicinity of the yoke 34B are fixed to the hub 32B over an entire circumferential extent thereof, and therefore, a deformation rarely occurs over the entire circumferential extent, allowing a high degree of roundness of the upper portion and a vicinity of the yoke 34B.

A portion of the yoke 34B which is not fixed to the hub 32B has low rigidity, and a deformation is apt to more easily occur over its circumferential extent with decreasing height from a top toward a bottom of that portion of the yoke 34B, allowing a reduction in the degree of roundness to easily occur. Accordingly, if a lower axial end portion and a vicinity of the yoke cylindrical portion 341B, which have a low degree of roundness, were fixed to the magnet 33B through adhesion, the magnet 33B might become deformed unevenly along the circumferential direction due to a change in a volume of an adhesive 80B at the time of curing thereof.

In particular, a second inner circumferential surface 620B is located radially outward of a first inner circumferential surface 610B. Therefore, a portion of the adhesive 80B which is provided in a second gap 712B has a greater volume per unit axial length than a portion of the adhesive 80B which is provided in a first gap 711B. Therefore, the change in the volume of the adhesive 80B at the time of the curing thereof is greater in the second gap 712B than in the first gap 711B.

In the motor 11B, no adhesive is provided in at least a lower axial end portion of the second gap 712B. In other words, no adhesive 80B is located between the magnet 33B and a lower axial end portion and a vicinity of the yoke 34B, which are apt to have a reduced degree of roundness. This contributes to reducing the likelihood of a deformation of the magnet 33B.

Note that a structure equivalent to the structure according to the above-described preferred embodiments may be applied to fix a yoke and a magnet to each other in a motor such as the motor 11B, in which the yoke cylindrical portion 341B has a uniform or substantially uniform thickness.

Note that, while the motor according to the above-described preferred embodiments preferably is a fixed-shaft motor, a structure equivalent to the structure according to the above-described preferred embodiments may be applied to fix a yoke and a magnet to each other in a rotating-shaft motor. Also note that, while the motor according to the above-described preferred embodiments preferably is an outer-rotor motor, a structure equivalent to the structure according to the above-described preferred embodiments may be applied to fix a yoke and a magnet to each other in an inner-rotor motor.

Also note that a structure equivalent to the structure according to the above-described preferred embodiments may be applied to fix a yoke and a magnet to each other in a motor designed to rotate a disk other than the magnetic disk(s), such as, for example, an optical disk.

In the motor according to the above-described preferred embodiments, the joining inner circumferential surface arranged to join the lower axial end of the first inner circumferential surface and the upper axial end of the second inner circumferential surface preferably is a tapered surface. Note, however, that the joining inner circumferential surface may alternatively be a curved surface or a surface in the shape of a shoulder.

Also note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention are applicable to motors and disk drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A motor comprising:
   a stationary portion including a stator; and
   a rotating portion configured to be rotatable about a central axis extending in a vertical direction; wherein
   the rotating portion includes:
      a cylindrical or substantially cylindrical magnet including a pole surface located radially opposite to the stator;
      a cylindrical or substantially cylindrical yoke located radially outside of the magnet; and
      a hub including a hub cylindrical portion located radially outside of the yoke, and a hub upper plate portion extending radially inward from an upper axial end of the hub cylindrical portion;
   the stator includes a stator core which includes a magnetic body;
   an upper portion of the yoke is fixed to the hub;
   the yoke includes:
      a first inner circumferential surface located radially opposite to an outer circumferential surface of the magnet with a first gap intervening therebetween; and
      a second inner circumferential surface located below the first inner circumferential surface, and including
      a portion located radially opposite to the outer circumferential surface of the magnet with a second gap intervening therebetween;
   the second inner circumferential surface is parallel or substantially parallel to the outer circumferential surface of the magnet, and is located radially outward of the first inner circumferential surface;
   an adhesive is provided in at least a portion of the first gap; and
   no adhesive is provided in at least a lower axial end portion of the second gap.

2. The motor according to claim 1, wherein the second gap has a radial width greater than a radial width of the first gap.

3. The motor according to claim 2, wherein no adhesive is located in an area at least from an axial lower axial end to an axial middle portion of the second gap.

4. The motor according to claim 3, wherein the yoke includes:
   a first cylindrical portion including the first inner circumferential surface; and
   a second cylindrical portion located below the first cylindrical portion, and including the second inner circumferential surface; and
   the second cylindrical portion has a radial width smaller than a radial width of the first cylindrical portion.

5. The motor according to claim 4, wherein an upper axial end portion of the second gap is located at an axial level lower than an axial level of an axial middle portion of the stator core, and radially overlaps with the stator core.

6. The motor according to claim 5, wherein
   the stator core has an axial dimension greater than a radial width of the stator core; and
   each of the magnet and the yoke has an axial dimension greater than the axial dimension of the stator core.

7. The motor according to claim 1, wherein there is no adhesive located in an area from at least a lower axial end to an axial middle portion of the second gap.

8. The motor according to claim 1, wherein the adhesive is located at least a lower axial end of the first gap.

9. The motor according to claim 1, wherein
   the yoke includes:
      a first cylindrical portion including the first inner circumferential surface; and
      a second cylindrical portion located below the first cylindrical portion, and including the second inner circumferential surface; and
   the second cylindrical portion has a radial width smaller than a radial width of the first cylindrical portion.

10. The motor according to claim 1, wherein
    the yoke further includes a joining inner circumferential surface joining a lower axial end of the first inner circumferential surface and an upper axial end of the second inner circumferential surface;
    the joining inner circumferential surface becomes gradually more distant from the central axis from an upper axial end toward a lower axial end thereof; and
    a lower surface of the adhesive located between the magnet and the yoke adjoins the joining inner circumferential surface.

11. The motor according to claim 1, wherein an upper axial end portion of the second gap is located at an axial level lower than an axial level of an axial middle portion of the stator core, and radially overlaps with the stator core.

12. The motor according to claim 1, wherein
    the stator core has an axial dimension greater than a radial width of the stator core; and each of the magnet and the yoke has an axial dimension greater than the axial dimension of the stator core.

13. The motor according to claim 12, wherein the stator core has an axial dimension greater than twice the radial width of the stator core.

14. The motor according to claim 1, wherein the stator core includes twelve or more electromagnetic steel sheets placed one upon another.

15. The motor according to claim 1, wherein the second gap has a radial width greater than a radial distance between the magnet and the stator core.

16. The motor according to claim 1, wherein the second gap has a volume greater than a volume of the first gap.

17. The motor according to claim 1, wherein the second gap has a volume greater than a volume of the adhesive located between the magnet and the yoke.

18. The motor according to claim 1, wherein
the hub further includes a projecting portion projecting from a lower surface of the hub upper plate portion to assume an annular or substantially annular shape; and
an inner circumferential surface of the yoke and an outer circumferential surface of the projecting portion are fixed to each other.

19. The motor according to claim 18, wherein the inner circumferential surface of the yoke and the outer circumferential surface of the projecting portion are fixed to each other through press fitting.

20. The motor according to claim 1, wherein
the hub further includes an annular disk mount portion extending radially outward from an outer circumference of the hub cylindrical portion, and including a disk mount surface; and
a lower surface of the adhesive located between the magnet and the yoke is located at an axial level lower than an axial level of the disk mount surface of the disk mount portion.

21. The motor according to claim 1, wherein a radial width of the second gap is uneven along a circumferential direction.

22. A disk drive apparatus comprising:
the motor according to claim 1;
an access portion configured to perform at least one of reading and writing of information from or to a disk supported by the hub of the motor; and
a housing configured to accommodate at least a portion of the motor and the access portion.

* * * * *